US008380790B2

(12) United States Patent
Lee et al.

(10) Patent No.: US 8,380,790 B2
(45) Date of Patent: Feb. 19, 2013

(54) VIDEO CONFERENCE RATE MATCHING

(75) Inventors: Ming Chieh Lee, Bellevue, WA (US); Mu Han, Redmond, WA (US); Tim Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 13 days.

(21) Appl. No.: 12/334,969

(22) Filed: Dec. 15, 2008

(65) Prior Publication Data
US 2010/0153574 A1    Jun. 17, 2010

(51) Int. Cl.
*G06F 13/00* (2006.01)
(52) U.S. Cl. .................. 709/205; 709/224; 709/231
(58) Field of Classification Search .......... 709/223, 709/226, 230, 231, 232, 204, 205, 224
See application file for complete search history.

(56) References Cited

U.S. PATENT DOCUMENTS

| | | | |
|---|---|---|---|
| 5,600,646 A | 2/1997 | Polomski | 370/263 |
| 5,687,095 A | 11/1997 | Haskell | |
| 6,501,797 B1 | 12/2002 | Van der Schaar et al. | 375/240.12 |
| 6,580,754 B1 * | 6/2003 | Wan et al. | 375/240.01 |
| 6,584,077 B1 | 6/2003 | Polomski | |
| 6,622,171 B2 * | 9/2003 | Gupta et al. | 709/231 |
| 7,007,098 B1 | 2/2006 | Smyth | |
| 7,034,860 B2 | 4/2006 | Lia et al. | |
| 7,054,774 B2 | 5/2006 | Batterberry et al. | |
| 7,073,011 B2 | 7/2006 | Lisitsa et al. | |
| 7,089,285 B1 | 8/2006 | Drell | |
| 7,313,593 B1 * | 12/2007 | Pulito et al. | 709/204 |
| 7,734,800 B2 * | 6/2010 | Gupta et al. | 709/231 |
| 7,764,632 B2 * | 7/2010 | Gray et al. | 370/260 |
| 2002/0131496 A1 * | 9/2002 | Vasudevan et al. | 375/240.11 |
| 2005/0010638 A1 | 1/2005 | Richardson et al. | 709/204 |
| 2005/0013309 A1 | 1/2005 | Ravishankar et al. | 370/401 |
| 2005/0122392 A1 | 6/2005 | Johansen et al. | 348/14.09 |
| 2006/0067251 A1 | 3/2006 | Hagendorf et al. | |
| 2006/0143678 A1 | 6/2006 | Chou | |
| 2006/0245377 A1 | 11/2006 | Hyeonkuk et al. | 370/260 |
| 2007/0022215 A1 * | 1/2007 | Singer et al. | 709/246 |

(Continued)

FOREIGN PATENT DOCUMENTS

| EP | 1395000 B1 | 1/2006 |
|---|---|---|
| KR | 10-2004-0069360 | 8/2004 |

(Continued)

OTHER PUBLICATIONS

Amplesky Communication Technologies Ltd., "Amplesky VM3000 Videoconferencing", (2003-2004), 3 pages.

(Continued)

*Primary Examiner* — Viet Vu
(74) *Attorney, Agent, or Firm* — Merchant & Gould

(57) ABSTRACT

Video conference rate matching may be provided. A video conference server may receive video source streams from clients on a video conference. The server may analyze each client's capabilities and choose a video stream to send to each client based on those capabilities. For example, a client capable of encoding and decoding a high definition video stream may provide three source video streams—a high definition stream, a medium resolution stream, and a low resolution stream. The server may send only the low resolution stream to a client with a low amount of available bandwidth. The server may send the medium resolution stream to another client with sufficient bandwidth for the high definition stream, but which lacks the ability to decode the high definition stream.

19 Claims, 6 Drawing Sheets

U.S. PATENT DOCUMENTS

| | | | |
|---|---|---|---|
| 2007/0024705 A1* | 2/2007 | Richter et al. | 348/142 |
| 2007/0206089 A1 | 9/2007 | Eshkoli et al. | |
| 2007/0263087 A1 | 11/2007 | Hong et al. | 348/14.13 |
| 2008/0025414 A1 | 1/2008 | Kim et al. | 375/240.26 |
| 2008/0043090 A1 | 2/2008 | Wiener et al. | |
| 2008/0043644 A1 | 2/2008 | Barkley et al. | |
| 2008/0046939 A1 | 2/2008 | Lu et al. | |
| 2008/0068446 A1 | 3/2008 | Barkley et al. | |
| 2008/0158337 A1 | 7/2008 | Richardson | |
| 2008/0183808 A1 | 7/2008 | Salesky et al. | |
| 2008/0195744 A1 | 8/2008 | Bowra et al. | |
| 2009/0184962 A1* | 7/2009 | Kuriakose et al. | 345/428 |
| 2009/0231415 A1* | 9/2009 | Moore et al. | 348/14.09 |
| 2009/0315975 A1 | 12/2009 | Wiener et al. | 348/14.09 |
| 2010/0002069 A1 | 1/2010 | Eleftheriadis et al. | 348/14.08 |
| 2010/0008421 A1* | 1/2010 | Gutman et al. | 375/240.16 |
| 2010/0091888 A1 | 4/2010 | Nemiroff | |

FOREIGN PATENT DOCUMENTS

| | | |
|---|---|---|
| KR | 10-2008-0010841 | 1/2008 |
| WO | WO 2006/010583 | 2/2006 |

OTHER PUBLICATIONS

Planet Enterprises Ltd. "Multi Bit-Rate Capture" (2006-2008), 2 pages.

IVCi, LLC, "Video Conferencing: Systems: Sony: Sony PCS-G50", (2008), 6 pages.

RadiSys Corporation "RadiSys Introduces Continuous Presence Video Conferencing Capabilities For Convedia Media Server Family"; (2008), 2 pages.

Polycom Inc. "Polycom VideoPlus Continuous Presence," (2004), 2 pages.

Feng Wu, et al., "Next Generation Mobile Multimedia Communications: Media Codec and Media Transport Perspectives", China Communications (Oct. 2006), 15 pages.

Eleftheriadis, E., et al.; "*Multipoint Videoconferencing with Scalable Video Coding*"; Mar. 1, 2006; Layered Media, Inc.; http://www.zju.edu.cn/jzus/downloadpdf.php?doi=10.1631/jzus.2006.A0696; 10 pgs.

Shapiro, O.; "*H.261/SVC (Scalable Video Coding)—New Video Compression Standard*"; May 19, 2009; ISC West & Expo; http://www.isccast.com/podcasts.isc365.com/powerpoint/09ISCWest_D108.pdf; 27 pgs.

International Search Report dated Feb. 9, 2012, issued in PCT Appl. No. PCT/US2011/039245.

Office Action mailed May 25, 2012, in U.S. Appl. No. 12/334,836.

International Search Report dated Jun. 3, 2010, issued in PCT Appl. No. PCT/US2009/063697.

International Search Report dated May 28, 2010, issued in PCT Appl. No. PCT/US2009/063739.

\* cited by examiner

VIDEO CONFERENCE RATE MATCHING

RELATED APPLICATION

Related U.S. patent application Ser. No. 12/334,836 filed on even date herewith and entitled "Video Conferencing Subscription Using Multiple Bit Rate Streams," assigned to the assignee of the present application, is hereby incorporated by reference.

BACKGROUND

Rate matching in video conferencing is a process for improving video conference performance. In some situations, a video conferencing client connected via the Internet may have a fluctuating amount of bandwidth while other clients are on a corporate intranet with a stable amount of bandwidth. The Internet client may not be able to receive the same quality video stream as the intranet clients and so the video conference system may be forced to degrade the video quality for all participating clients to a level that the lowest performing client can handle. That is, the system may force the intranet clients to compromise and sacrifice their capabilities, and only encode/receive at low-bit rate streams with a low-resolution and low-frame rate experience.

For example, for the intranet clients may be able to encode and play back at VGA resolution (640×480 pixels per frame) with a frame rate of 30 frames per second (fps). The Internet client may only be able to encode and receive at CIF resolution (320×240) with a 15 fps rate. The conventional strategy is to force every client to encode and receive at the lower, CIF resolution or to have a video conferencing system drop alternate frames from a VGA resolution stream.

SUMMARY

Video conference rate matching may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Video conference rate matching may be provided. A video conference server may receive video source streams from clients on a video conference. The server may analyze each client's capabilities and choose a video stream to send to each client based on those capabilities. For example, a client capable of encoding and decoding a high definition video stream may provide three source video streams—a high definition stream, a medium resolution stream, and a low resolution stream. The server may send only the low resolution stream to a client with a low amount of available bandwidth. The server may send the medium resolution stream to another client with sufficient bandwidth for the high definition stream, but which lacks the ability to decode the high definition stream.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
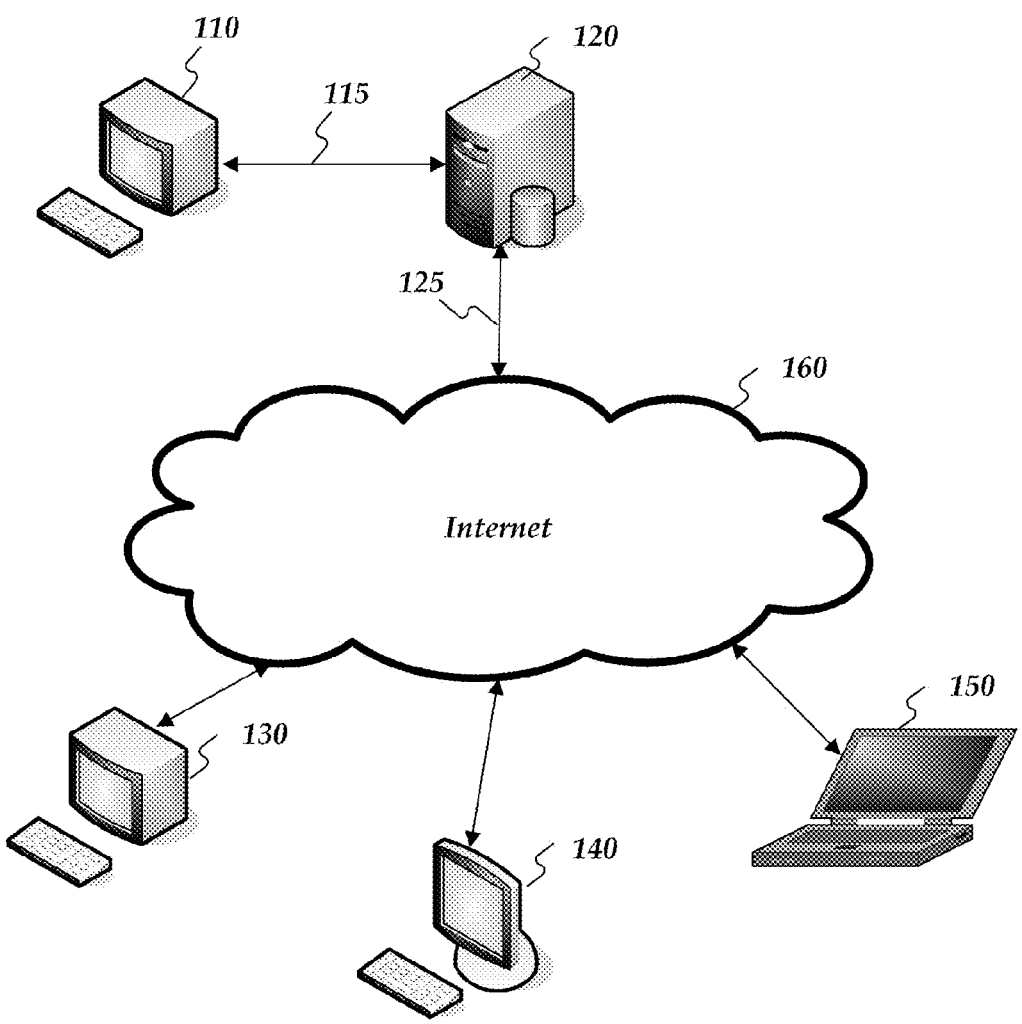
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Video conference rate matching may be provided. Consistent with embodiments of the present invention, a multiple bit rate (MBR) scheme may be used to stream data to clients consistent with the clients' ability to receive and process the data.

FIG. 1 is a block diagram of an operating environment. The operating environment may comprise a video conference environment 100. Video conference environment 100 may comprise an intranet client 110 and a video conference server 120 connected via an intranet network connection 115. Video conference environment 100 may further comprise a first Internet client 130, a second Internet client 140, and a third Internet client 150. Each of the Internet clients may be connected to video conference server 120 via the Internet 160. Consistent with embodiments of the invention, video conference server 120, intranet client 110, first Internet client 130, second Internet client 140, and third Internet client 150 may each comprise a computing device 600, described below in greater detail with respect to FIG. 6.

Video conference environment 100 may be used when multiple clients want to share data streams amongst each other. Each client may connect to video conference server 120. Video conference server 120 may maintain a list of which clients are connected and what each client's capabilities are. Consistent with embodiments of the invention, video conference server 120 may periodically update any changes in the client's capabilities. For example, video conference server 120 may analyze intranet network connection 115 and determine that intranet client 110 may have more bandwidth available than previously determined. Video conference server 120 may store that information for use in facilitating the data sharing. Video conference server 120 may be responsible for determining which clients may be responsible for sending data streams to video conference server 120 and for sending data streams out to each connected client.

Each client may encode at least one data stream to send to video conference server 120. For example, each client may have an audio/video input such as a webcam and/or microphone connected to the client. The input may be used to generate a video stream (that may include audio) and encode the video stream before sending it to video conference server 120. Video conference server 120 may receive encoded streams from each client and decide which streams to relay to each client. For example, intranet client 110 may encode a video stream as a series of video frames comprising a person currently talking. Video conference server 120 may send the encoded stream showing the current speaker from intranet client 110 to first Internet client 130, second Internet client 140, and third Internet client 150. Video conference server 120 may send an encoded source stream from each of first Internet client 130, second Internet client 140, and third Internet client 150 to intranet client 110 to show the audience members.

Figure 2A:
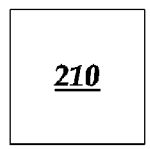
FIGS. 2A-2C are diagrams illustrating video stream encoding algorithms using different frame types.
Figure 2B:
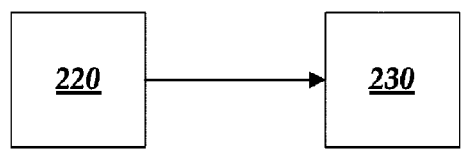
Figure 2C:
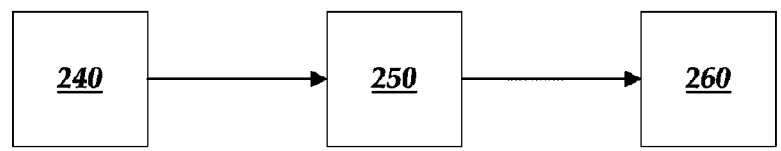

FIGS. 2A-2C are diagrams illustrating video stream encoding algorithms using different frame types. A video stream may be encoded as a series of video frames wherein each frame may comprise a single image. Each frame may be represented by bits of data. The video stream may be encoded so that not every bit of data in every frame needs to be sent in order to represent the source of the video stream. Different frame types may be used to encode and/or compress the video stream.

Frame types may comprise I-frames, P-frames, and B-frames. I-frame stands for Intra-Frame, and may comprise a frame that may be decoded by itself without reference to any other frame in a video stream. P-frame stands for Predicted Frame and may be decoded by referencing at least one previous frame in the video stream sequence. B-frame stands for Bidirectional Predicted Frame and may be decoded by referencing at least one previous frame and at least one subsequent frame in the video stream.

FIG. 2A comprises an I (Intraframe) frame 210. I-frame 210 may be encoded without reference to other frames and may be decoded independent of any other frame. I frames may allow random access in a video stream. I-frames may be the largest frames in size and the least compressed.

FIG. 2B comprises a P (Predictive) frame 230. P-frame 230 may be encoded using a previous frame 220 as a reference and may only be decoded correctly if previous frame 220 is available. P frame 230 may be smaller and more compressed than I frame 210. Previous frame 220 may comprise an I-frame and/or a P-frame.

FIG. 2C comprises a B (Bi-directional) frame 250. B-frame 250 may be encoded using information from a previous frame 240 and a next frame 260. B-frame 250 may be decoded correctly if previous frame 240 and next frame 260 are available. B frame 250 may be smaller and more compressed than P-frame 230 and I-frame 210.

Using different frame types to encode the video stream may take advantage of a source in which there is a great deal of similarity between two subsequent frames in order to reduce the amount of data that needs to be sent to a viewing client. For example, intranet client 110 may be encoding and transmitting a video stream of a person talking in front of a static background. Because the person talking may not be moving much, the video stream may be encoded using P-frames so that P-frame 230 may comprise only bits of data representing changes in the image when compared to previous frame 220.

Figure 3:
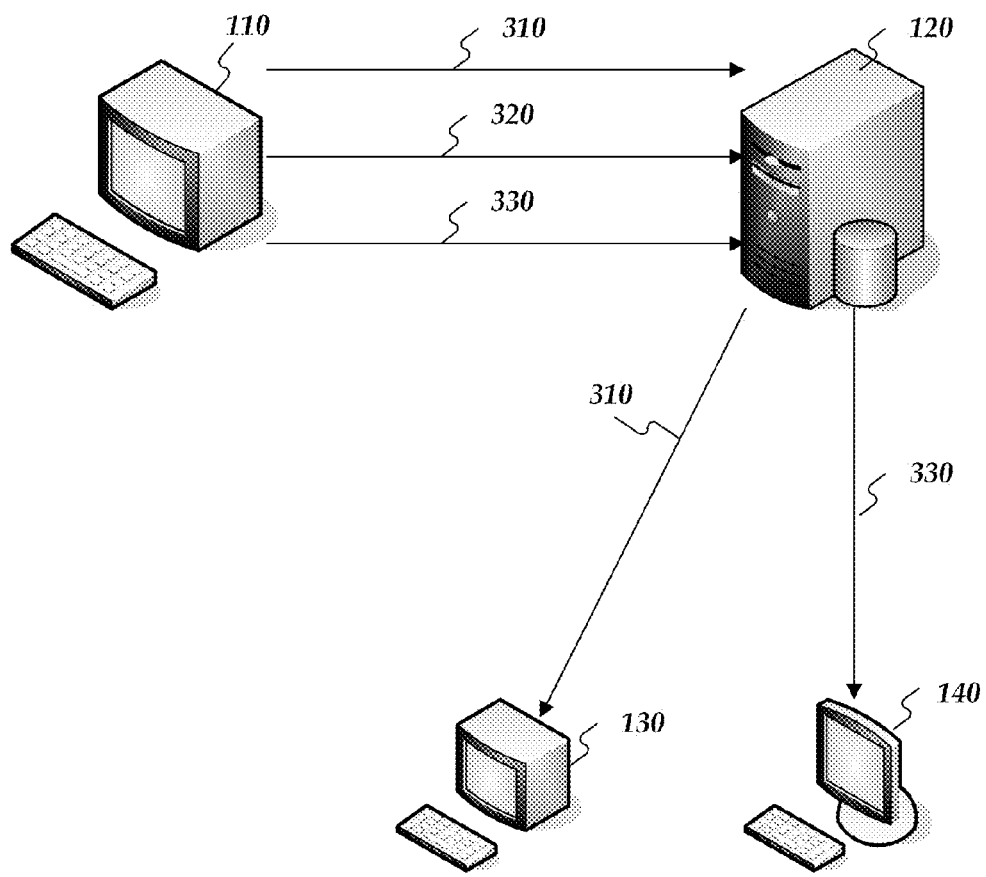
FIG. 3 is a diagram illustrating video conference rate matching.

FIG. 3 is a diagram illustrating video conference rate matching. As described above with respect to FIG. 1, video conference system 100 may comprise intranet client 110, video conference server 120, first Internet client 130, and second Internet client 140. Consistent with embodiments of the invention, clients in video conference system 100 may connect with different bandwidths and/or different video encoding and/or decoding capabilities. Each client in video conference system 100 may register with video conference server 120 and establish at least one capability such as available bandwidth, a maximum encoding resolution, a maximum decoding resolution, and available data encoding and/or decoding algorithms. For example, intranet client 110 may register with video conference server 120 and establish an available bandwidth of 2 Mbps with capability to encode/decode a video stream with VGA (640×480) resolution at 30 fps and CIF (320×240) resolution at 15 fps. First Internet client 130 may register with video conference server 120 and establish an available bandwidth of 150 Kbps with capability to encode/decode a video stream with 720 p (1280×720) resolution at 30 fps, VGA (640×480) resolution at 30 fps, and CIF (320×240) resolution at 15 fps. Second Internet client 140 may register with video conference server 120 and establish an available bandwidth of 200 Kbps with capability to encode/decode a video stream only at CIF (320×240) resolution at 15 fps.

Consistent with embodiments of the invention, clients may be capable of encoding a video stream they may be incapable of decoding, and vice versa. For example, second Internet client 140 may be capable of receiving and decoding VGA resolution video streams, but may only be able to encode a CIF resolution video stream. In this scenario, intranet client 110 and first Internet client 130 may only encode a single video stream at VGA resolution that video conference server 120 may send to second Internet client 140. The CIF resolution encoded video stream from second Internet client 140 may continue to be sent to intranet client 110 and first Internet client 130.

After a video conference call is established and the capabilities for each client are registered with video conference server 120, video conference server 120 may communicates an encoding request to each client. For example, intranet client 110 and first Internet client 130 may be requested to each encode two video streams and send them to video conference server 120—a first version of the video stream may be encoded with VGA resolution at 30 fps and a second version of the video stream may be encoded with CIF resolution at 15 fps. Second Internet client 140 may be requested to encode one video stream with CIF resolution at 15 fps.

Video conference server 120 may then receive the stream(s) from each client and choose at least one received stream to send to each client based on the registered and/or determined capabilities of each client, such as determining which encoding algorithms each client is capable of decoding. For example, video conference server 120 may determine that second Internet client 140 is only capable of decoding a CIF resolution video stream while intranet client 110 and first Internet client are capable of decoding both VGA resolution and CIF resolution video streams. Video conference server 120 may then send the CIF resolution stream received from second Internet client 140 to intranet client 110 and first Internet client 130. Video conference server 120 may send the VGA resolution stream from intranet client 110 to first Internet client 130 and the CIF stream from intranet client 110 to second Internet client 140. Similarly, video conference server 120 may send the VGA resolution stream from first Internet client 130 to intranet client 110 and the CIF stream from first Internet client 130 to second Internet client 140.

Video conference server 120 may determine whether each client has sufficient bandwidth to receive a video stream and may choose a different stream based on that determination. Consistent with further embodiments of the invention, video conference server 120 and/or one of the clients such as first Internet client 130 may periodically re-evaluate the amount of bandwidth available. For example, video conference server 120 may determine that bandwidth available to first Internet client 130 has dropped from 150 Kbps to 75 Kbps and may begin sending the CIF resolution video stream instead of the VGA resolution video stream from intranet client 110 to first Internet client 130.

Video conference server 120 may also periodically re-evaluate each client's encoding/decoding capabilities, and dynamically alter what encoding algorithms are requested for video streams for each client. For example, second Internet client 140 may be the only client receiving the CIF resolution video streams from intranet client 110 and first Internet client 130. If second Internet client 140 drops out of the video conference call, video conference server 120 may request that intranet client 110 and first Internet client stop encoding and sending a CIF resolution version of their respective video streams.

Consistent with embodiments of the invention, video conference server 120 may instruct at least one of the clients associated with the video conference call to encode a video stream determined to be in-use by one of the other clients associated with the video conference call. For example, video conference server 120 may determine that second Internet client 140 is currently using CIF decoding; video conference server 120 may instruct first Internet client 130 to encode a CIF resolution stream to send to video conference server 120 that may be relayed to second Internet server 140.

Further consistent with embodiments of the invention, video conference server 120 may alter a video stream before sending it to a client. For example, intranet client 110 may be capable of encoding and sending video streams at a 720 p, VGA, and CIF resolutions and have a large, stable amount of bandwidth available. First Internet client 130 may be capable of receiving and decoding video streams at a 720 p, VGA, and CIF resolutions, but have a highly variable amount of bandwidth available. As the bandwidth available to first Internet client 130 reduces, video conference server 120 may alter the video stream relayed from intranet client 110 to first Internet client 130 as best suited to the available amount of bandwidth. For example, from the highest amount of bandwidth available to the lowest, video conference server may use the following logic:

1. Send unaltered 720 p stream,
2. Drop 1 B frame for the 720 p stream,
3. Drop 2 B frames for the 720 p stream,
4. Send unaltered VGA stream,
5. Drop 1 B frame for the VGA stream,
6. Drop 2 B frames for the VGA stream,
7. Send unaltered CIF stream,
8. Drop 1 B frame for the CIF stream,
9. Drop 2 B frames for the CIF stream,
10. Drop all B and P frames for the 720 p stream (only keep I frames),
11. Drop all B and P frames for the VGA stream (only keep I frames), and
12. Drop all B and P frames for the CIF stream (only keep I frames).

The choice of streams sent to each client may depend on each client's viewing preferences as well as the client's capabilities. For example, first Internet client 130 may be configured to view the other two participants in video conference system 100 side by side, simultaneously, while second Internet client 140 may be configured to only show a current speaker. In that case, video conference server may send the VGA resolution stream from intranet client 110 and the CIF resolution stream from second Internet client 140 to first Internet client 130. Second Internet client 140 may alternately receive the CIF resolution streams from intranet client 110 and first Internet client 130 as each of those clients speak on the video conference call.

Figure 4:
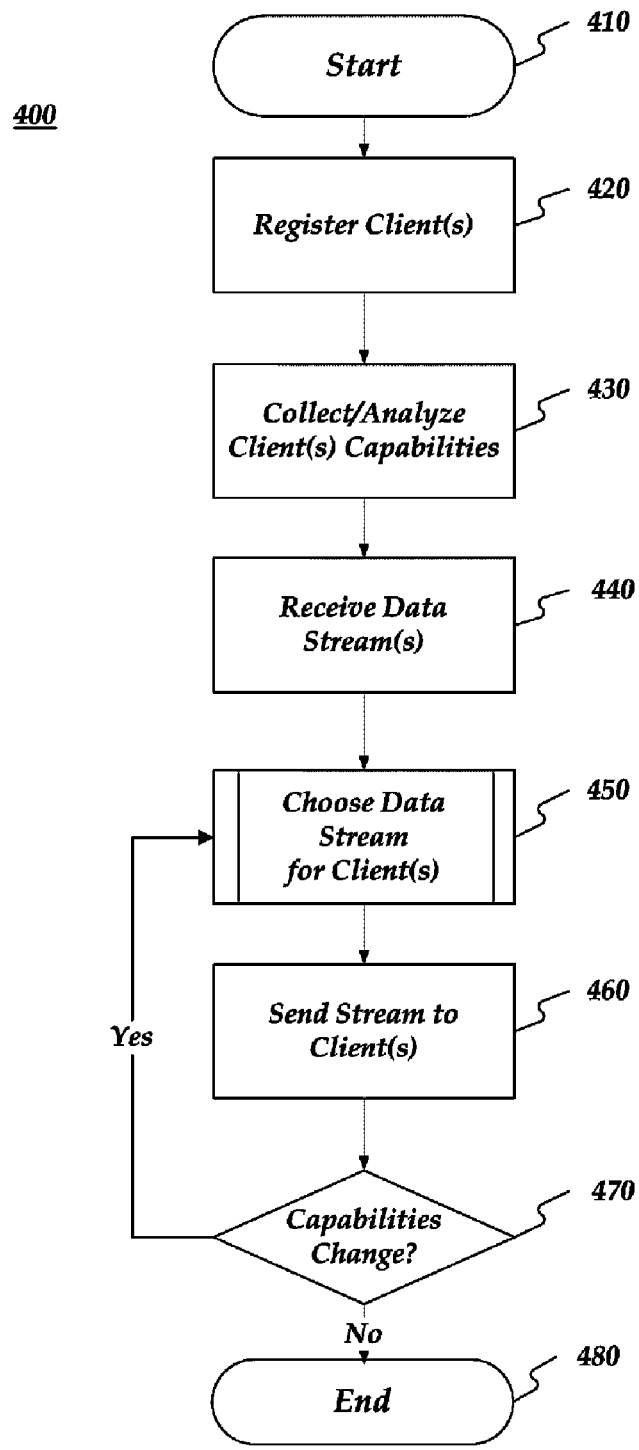
FIG. 4 is a flow chart of a method for providing rate matching in video conferencing.

FIG. 4 is a flow chart setting forth the general stages involved in a method 400 consistent with an embodiment of the invention for providing video conference rate matching. Method 400 may be implemented using a computing device 600 as described in more detail below with respect to FIG. 6. Ways to implement the stages of method 400 will be described in greater detail below. Method 400 may begin at starting block 410 and proceed to stage 420 where computing device 600 may register at least one client. For example, the at least one client may be operatively connected to computing device 600 via a network connection and may request participation in a video conference call hosted by computing device 600.

From stage 420, method 400 may advance to stage 430 where computing device 600 may collect and/or analyze capabilities of each registered client. For example, computing device 600 may determine an amount of bandwidth available to each client. Computing device 600 may also determine data processing capabilities for each client, such as video encoding and/or decoding capability and/or data processing speed. Video encoding/decoding capability may include a maximum resolution.

From stage 430, method 400 may advance to stage 440 where computing device 600 may receive a data stream from at least one client. For example, computing device 600 may receive a video stream from a source client. Each client may send at least one stream, and each client may be operative to send multiple versions of the data stream, such as different resolutions of a video stream.

From stage 440, method 400 may advance to subroutine 450 where computing device 600 may choose a data stream to send to at least one client. For example, computing device 600 may determine that one client does not have sufficient bandwidth to receive a high resolution version of a video stream from a second client and computing device 600 may choose a low resolution version of the video stream to send. Further details regarding subroutine 450 may be described below with respect to FIG. 5.

From subroutine 450, method 400 may advance to stage 460 where computing device 600 may send the chosen stream to the client. For example, computing device 600 may relay a video stream received from one client over a network connection to a second client.

From stage 460, method 400 may advance to stage 470 where computing device 600 may determine whether the capabilities of a client have changed. If computing device 600 determines that the capabilities of a client and/or the requirements of the system have changed, method 400 may return to subroutine 450 where computing device 600 may choose different video streams to send to the clients. For example, computing device 600 may determine that the only client in a video conference call utilizing CIF decoding has dropped out. Computing device 600 may then request that any other clients on the video conference call stop sending CIF encoding streams. Consistent with embodiments of the invention, a client's available bandwidth may decrease, and the client may inform computing device 600 of this occurrence. Computing device 600 may choose a lower resolution data stream for that client and/or alter the currently chosen data stream for that client to take the reduced bandwidth into account.

From stage 470, method 400 may end at stage 480.

Figure 5:
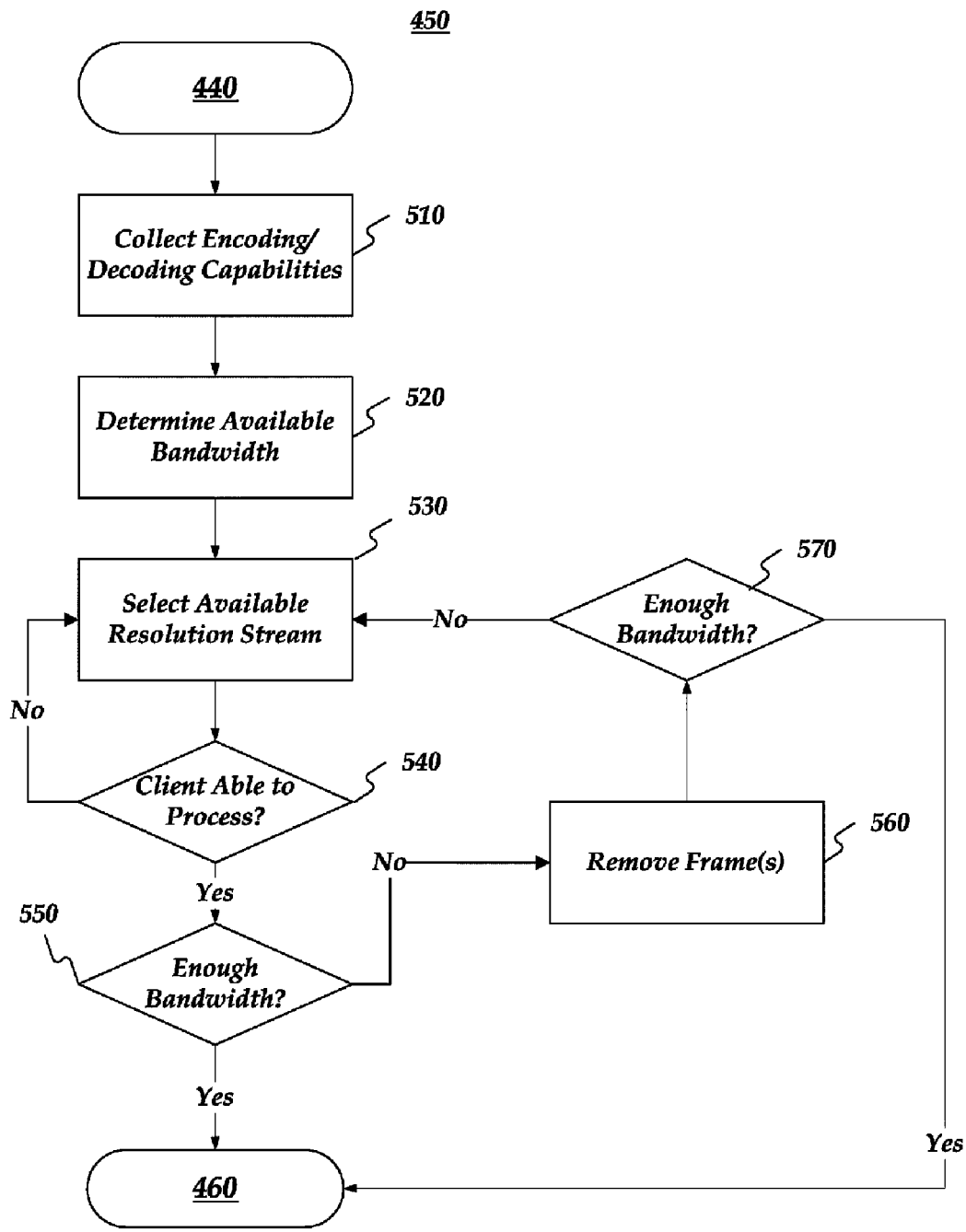
FIG. 5 is a flow chart of a subroutine used in the method of FIG. 4 for choosing a data stream for a client.

FIG. 5 is a flow chart of a subroutine used in the method of FIG. 4 for choosing a data stream for a client. From stage 440, computing device 600 may enter subroutine 450 at stage 510 where computing device 600 may collect encoding and/or decoding capabilities for at least one client. The at least one client may comprise another computing device 618 such as intranet client 110. For example, computing device 600 may determine that intranet client 110 is capable of encoding at VGA and CIF resolutions and decoding at 720 p, VGA, and CIF resolutions.

From stage 510, subroutine 450 may advance to stage 520 where computing device 600 may determine an available amount of bandwidth for at least one client. For example, computing device 600 may determine that intranet client 110 has 400 Kbps available for sending a data stream and 750 Kbps available for receiving a data stream.

From stage 520, subroutine 450 may advance to stage 530 where computing device 600 may select a highest resolution data stream available for a client. For example, first Internet client may be sending three data streams to computing device 600: a 720 p resolution video stream, a VGA resolution video stream, and a CIF resolution video stream. Computing device may first select the 720 p resolution video stream for sending to intranet client 110.

From stage 530, subroutine 450 may advance to stage 540 where computing device 600 may determine whether a client is able to process the selected data stream. For example, computing device 600 may determine whether intranet client 110 is capable of decoding the selected 720 p resolution video stream. If, at stage 540, computing device 600 determines that a client cannot process the selected video stream, subroutine 540 may return to stage 530 where computing device 600 may select an alternate data stream, such as a VGA resolution version of the 720 p resolution video stream.

If, at stage 540, computing device 600 determines that a client is able to process the selected stream, subroutine 450 may advance to stage 550 where computing device 600 may determine whether the client has enough bandwidth available to receive the selected data stream without substantial performance degradation. For example, computing device 600 may determine that the client has 700 Kbps of bandwidth available and that this is sufficient bandwidth to receive and play back a 720 p resolution video stream in real time with little to no skips and/or pauses in the video. If computing device 600 determines that the client has sufficient bandwidth for the selected stream at stage 550, subroutine 450 may return to stage 460 of method 400.

If, at stage 550, computing device determines that the client does not have sufficient bandwidth to receive and process the selected stream, subroutine 450 may advance to stage 560, where computing device 600 may alter the selected stream before sending it to the client. For example, computing device 600 may remove at least one B-frame per second from the video stream to reduce the amount of data to be sent to the client. Subroutine 450 may advance to stage 570 where computing device 600 may determine whether a client has enough bandwidth to receive the altered data stream. If the client still does not have enough bandwidth to receive the altered stream, subroutine 450 may return to stage 530 where computing device 600 may select an alternate data stream, such as a VGA resolution version of the 720 p resolution video stream. Consistent with embodiments of the invention, computing device 600 may remove additional frames and/or remove different types of frames and determine whether the bandwidth constraints may be met before returning to stage 530. If, at stage 550, computing device determines that the client does have enough bandwidth to receive and process the altered data stream, subroutine 450 may return to stage 460 of method 400.

An embodiment consistent with the invention may comprise a system for providing data to a plurality of clients. The system may comprise a memory storage and a processing unit coupled to the memory storage. The processing unit may be operative to receive data streams, analyze at least one capability associated with at least one of the plurality of clients, choose a data stream to send to the client based on the analyzed capability, and send the chosen data stream to the client. For example, the data streams may video conferencing data streams, and each stream may be associated with at least one of the plurality of clients. At least one of the clients may send multiple data streams comprising different versions of the data stream, such as different resolutions of a video stream.

The clients may connect to the system via a communication medium such as a corporate intranet and/or the Internet. The system may be operative to analyze available bandwidth of the communication medium associated with at least one of the plurality of clients. The system may be operative to analyze a data processing capability associated with at least one of the plurality of clients, such as a video encoding and/or video decoding capability. The system may determine whether a given client is capable of decoding an available data stream and whether a client is capable of encoding a data stream in an algorithm requested by another client.

Another embodiment consistent with the invention may comprise a system for providing video streams to a plurality of clients. The system may comprise a memory storage and a processing unit coupled to the memory storage. The processing unit may be operative to receive at least one video stream from each of the plurality of clients, collect video conference capability data associated with each of the plurality of clients, select at least one video stream to send to each of the plurality of clients according to the collected video conference capability data associated with each of the plurality of clients, and send the selected at least one video stream to each of the plurality of clients. The system may be operative to receive at least one first video stream and at least one second video stream from at least one of the plurality of clients wherein the at least one first video stream comprises a higher resolution version of the at least one second video stream. For example, the at least one first video stream may comprise a video stream encoded at a 1280×720 and/or a 640×480 resolution and the second video stream may comprise a video stream encoded at a resolution of 320×240.

The system may be further operative to determine whether at least one of the plurality of clients has sufficient bandwidth to receive all of the frames comprising at least one first video stream. In response to determining that the at least one of the plurality of clients has sufficient bandwidth to receive all of the frames comprising the at least one video stream, the system may send the at least one video stream to the at least one of the plurality of clients unaltered. If the at least one of the plurality of clients does not have sufficient bandwidth to receive all of the frames comprising the at least one first video stream, the system may send at least one second, lower resolution video stream to the at least one of the plurality of clients. Consistent with embodiments of the invention, if the at least one of the plurality of clients does not have sufficient bandwidth to receive all of the frames comprising the at least one first video stream, the system may remove at least one frame per second from the video stream prior to sending the at least one first video stream to the at least one of the plurality of clients.

The system may be operative to determine, for each of the plurality of clients, at least one in-use video decoding algorithm and at least one available video encoding algorithm. The system may instruct at least one of the plurality of clients to encode at least one video stream for the at least one video encoding algorithm associated with each of the plurality of clients that is determined to be in-use by at least one of the plurality of clients. For example, if one client is currently using CIF decoding to receive and process video streams, the system may request that at least one other client with CIF-encoding capability encode and send a CIF-encoded video stream to the system for relay to the CIF-decoding client.

Yet another embodiment consistent with the invention may comprise a system for providing rate matching in a video conference. The system may comprise a memory storage and a processing unit coupled to the memory storage. The processing unit may be operative to register at least one first video conference client and at least one second video conference client operatively connected to the system via the network connection device, receive a plurality of video streams from the at least one first video conference client, determine, based on the established at least one capability for the at least one second video conference client, whether the at least one second video conference client can receive the at least one first video stream, and in response to determining that the at least one second video conference client can receive the at least one first video stream, send the at least one first video stream to the at least one second video conference client without decoding the at least one first video stream by the system. The system may be operative to establish at least one capability for the at least one first video conference client and the at least one second video conference client, wherein the at least one capability comprises at least one of: an available bandwidth, a maximum encoding resolution, and a maximum decoding resolution. The plurality of video streams may comprise at least one first video stream and at least one second video stream wherein the at least one first video stream comprises a higher resolution video stream than the at least one second video stream.

The system may be operative to determine whether the at least one second video conference client can decode the at least one first video stream. Consistent with embodiments of the invention, the system may be operative to determine whether the at least one second video conference client has sufficient bandwidth available to receive the at least one first video stream without dropping at least one B-frame from the at least one first video stream.

Figure 6:
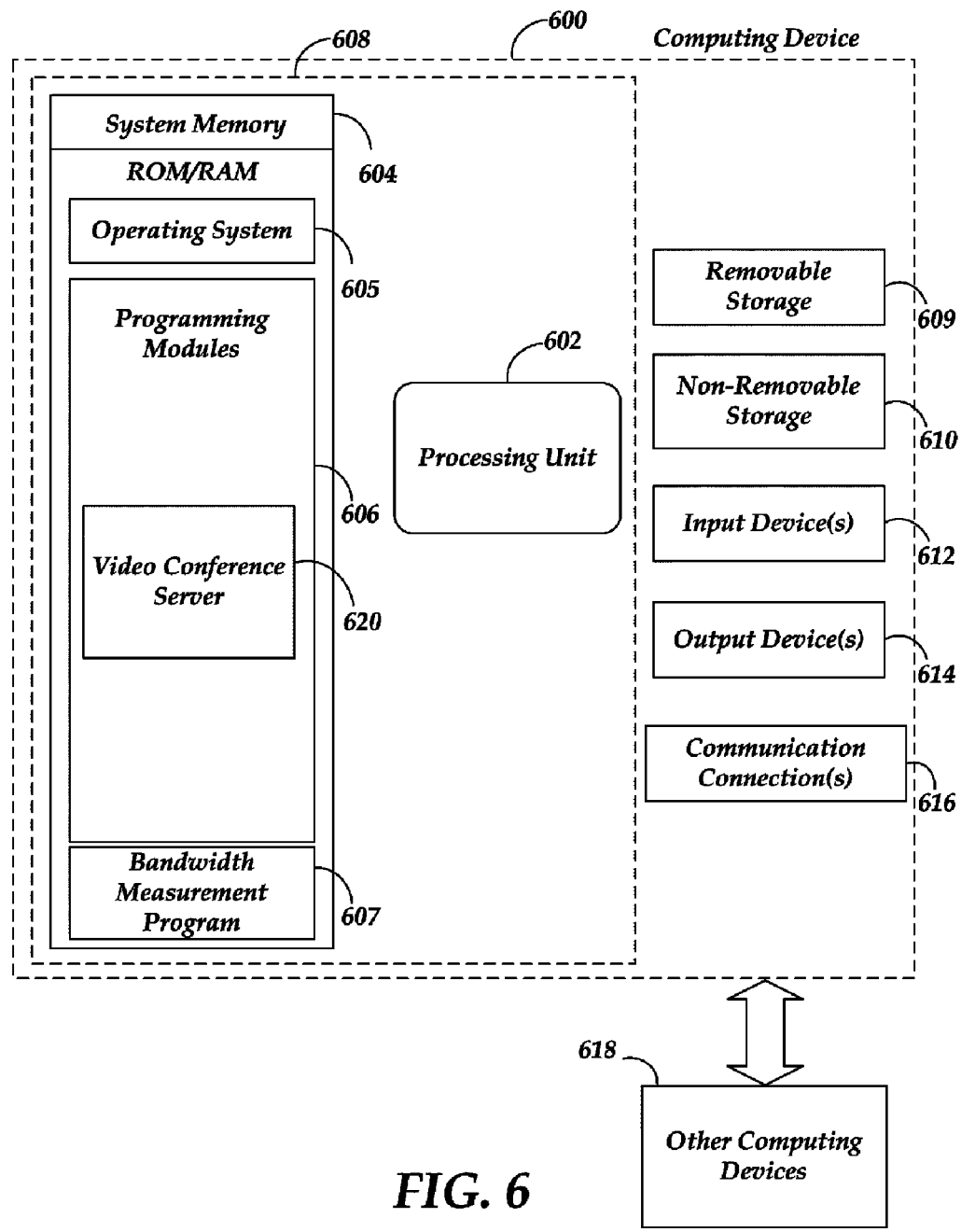
FIG. 6 is a block diagram of a system including a computing device.

FIG. 6 is a block diagram of a system including computing device 600. Consistent with an embodiment of the invention, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the invention. Furthermore, computing device 600 may comprise an operating environment for system 100 as described above. System 100 may operate in other environments and is not limited to computing device 600.

With reference to FIG. 6, a system consistent with an embodiment of the invention may include a computing device, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include a bandwidth measurement program 607. Operating system 605, for example, may be suitable for controlling computing device 600's operation. In one embodiment, programming modules 606 may include, for example, a data analysis module and/or a video conference server 620. Furthermore, embodiments of the invention may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g. video conference server 620) may perform processes including, for example, one or more of method 400's stages as described above. The aforementioned process is an example, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing data to a plurality of clients, the method comprising:
    receiving a plurality of data streams that are each of different video resolutions from each of at least two of a plurality of clients;
    analyzing at least one capability associated with at least one of the plurality of clients;
    choosing at least one of the plurality of data streams from each of the at least two of the plurality of clients to send to the at least one of the plurality of clients based on the analyzed at least one capability; and
    after choosing the at least one of the plurality of data streams, sending the chosen at least one of the plurality of data streams to the at least one of the plurality of clients.

2. The method of claim 1, wherein the plurality of data streams comprises a plurality of video conferencing data streams.

3. The method of claim 1, wherein each of the plurality of data streams is associated with at least one of the plurality of clients.

4. The method of claim 1, wherein analyzing at least one capability associated with the at least one of the plurality of clients comprises analyzing a bandwidth of at least one communication medium associated with at least one of the plurality of clients.

5. The method of claim 4, wherein the at least one communication medium associated with at least one of the plurality of clients comprises the Internet.

6. The method of claim 4, wherein the at least one communication medium associated with at least one of the plurality of clients comprises an intranet.

7. The method of claim 1, wherein analyzing the at least one capability associated with the at least one of the plurality of clients comprises analyzing a data processing capability associated with at least one of the plurality of clients.

8. The method of claim 7, wherein analyzing the at least one capability associated with the at least one of the plurality of clients comprises determining at least one video decoding capability.

9. The method of claim 1, wherein at least one first client of the plurality of clients is associated with a plurality of data streams and wherein at least one first data stream of the plurality of data streams comprises a higher resolution version of at least one second data stream of the plurality of data streams.

10. The method of claim 9, wherein analyzing the at least one capability associated with the at least one of the plurality of clients comprises determining whether at least one second client of the plurality of clients is capable of decoding the at least one first data stream.

11. The method of claim 9, wherein analyzing the at least one capability associated with the at least one of the plurality of clients comprises determining whether at least one second client of the plurality of clients has sufficient bandwidth to receive the at least one first data stream.

12. A computer-readable storage medium that is not a signal which stores a set of instructions which when executed performs a method for providing video streams to a plurality of clients, the method executed by the set of instructions comprising:
    receiving at least one video stream from each of the plurality of clients and more than one video stream that are different resolutions from at least one of the plurality of the clients;
    collecting video conference capability data associated with each of the plurality of clients;
    for each of the plurality of clients, selecting at least one video stream to send to each of the plurality of clients according to the collected video conference capability data associated with each of the plurality of clients; and
    after selecting the at least one video steam, sending the selected at least one video stream to each of the plurality of clients.

13. The computer-readable storage medium of claim 12, further comprising receiving at least one first video stream and at least one second video stream from at least one of the plurality of clients wherein the at least one first video stream comprises a higher resolution version of the at least one second video stream.

14. The computer-readable storage medium of claim 13, wherein the at least one first video stream comprises a video stream encoded at a resolution comprising at least one of: 1280×720 and 640×480 and wherein the at least one second video stream comprises a video stream encoded at a resolution of 320×240.

15. The computer-readable storage medium of claim 12, further comprising:
    determining whether at least one of the plurality of clients has sufficient bandwidth to receive all of the frames comprising at least one first video stream; and
    in response to determining that the at least one of the plurality of clients has sufficient bandwidth to receive all of the frames comprising the at least one video stream, sending the at least one video stream to the at least one of the plurality of clients unaltered.

16. The computer-readable storage medium of claim 15, further comprising:
    in response to determining that the at least one of the plurality of clients does not have sufficient bandwidth to receive all of the frames comprising the at least one first video stream, sending at least one second video stream to the at least one of the plurality of clients, wherein the at least one second video stream comprises a lower resolution version of the at least one first video stream.

17. The computer-readable storage medium of claim 15, further comprising:
    in response to determining that the at least one of the plurality of clients does not have sufficient bandwidth to receive all of the frames comprising the at least one first video stream, removing at least one frame per second from the video stream prior to sending the at least one first video stream to the at least one of the plurality of clients.

18. The computer-readable storage medium of claim 12, further comprising:
    determining, for each of the plurality of clients, at least one in-use video decoding algorithm;
    determining, for each of the plurality of clients, at least one video encoding algorithm associated with each of the plurality of clients; and
    instructing at least one of the plurality of clients to encode at least one video stream for the at least one video encoding algorithm associated with each of the plurality of clients that is determined to be in-use by at least one of the plurality of clients.

19. A system for providing rate matching in a video conference, the system comprising:
    a memory storage;
    a network connection device; and
    a processing unit coupled to the memory storage, wherein the processing unit is operative to:
        register video conference clients comprising a first video conference client, a second video conference client and a third video conference client operatively connected to the system via the network connection device, wherein being operative to register the video conference clients comprises being operative to establish at least one capability for each of the video conference clients, wherein the at least one capability comprises at least one of: an available bandwidth, a maximum encoding resolution, and a maximum decoding resolution;
        receive a plurality of video streams from at least two of the video conference clients, wherein the plurality of video streams comprise at least one first video stream and at least one second video stream wherein the at least one first video stream comprises a higher resolution video stream than the at least one second video stream;

determine, based on the established at least one capability for the at least one of the video conference clients, whether the at least one video conference client can receive the at least one first video stream wherein being operative to determine that the at least one video conference client can receive the at least one first video stream comprises being operative to determine at least one of: whether the at least one video conference client can decode the at least one first video stream and whether the at least one video conference client has sufficient bandwidth available to receive the at least one first video stream without dropping at least one B-frame from the at least one first video stream; and in response to determining that the at least one video conference client can receive the at least one first video stream, send the at least one first video stream to the at least one video conference client without decoding the at least one first video stream by the system.

* * * * *